(12) United States Patent
Chen

(10) Patent No.: US 12,203,538 B2
(45) Date of Patent: Jan. 21, 2025

(54) CONTROL PULL-BAR STRUCTURE OF CHAIR ADJUSTING DEVICE

(71) Applicant: Hsin-Hua Chen, Kaohsiung (TW)

(72) Inventor: Hsin-Hua Chen, Kaohsiung (TW)

( * ) Notice: Subject to any disclaimer, the term of this patent is extended or adjusted under 35 U.S.C. 154(b) by 115 days.

(21) Appl. No.: 18/129,091

(22) Filed: Mar. 31, 2023

(65) Prior Publication Data
US 2024/0280168 A1    Aug. 22, 2024

(30) Foreign Application Priority Data
Feb. 22, 2023    (TW) .................. 112201579

(51) Int. Cl.
| | |
|---|---|
| A47C 1/024 | (2006.01) |
| A47C 1/027 | (2006.01) |
| A47C 1/032 | (2006.01) |
| F16H 51/00 | (2006.01) |

(52) U.S. Cl.
CPC ............. *F16H 51/00* (2013.01); *A47C 1/027* (2013.01); *A47C 1/024* (2013.01); *A47C 1/032* (2013.01)

(58) Field of Classification Search
CPC .......... A47C 1/024; A47C 1/027; A47C 1/032
USPC .............................................. 297/300.1–309
See application file for complete search history.

(56) References Cited

U.S. PATENT DOCUMENTS

| | | | | |
|---|---|---|---|---|
| 2,278,080 A | * | 3/1942 | Koenigkramer | A61G 15/02 297/328 X |
| 3,602,546 A | * | 8/1971 | Tabor | A47C 1/024 297/374 |
| 3,801,155 A | * | 4/1974 | Hodgen | B60N 2/2227 297/374 X |
| 4,062,587 A | * | 12/1977 | Wolters | A47C 1/027 297/302.6 |
| 4,198,094 A | * | 4/1980 | Bjerknes | A47C 1/022 297/300.4 |
| 4,392,686 A | * | 7/1983 | Beer | A47C 1/027 297/376 X |
| 4,636,004 A | * | 1/1987 | Neumuller | A47C 1/027 297/300.8 |
| 4,640,547 A | * | 2/1987 | Fromme | A47C 1/0325 297/300.1 X |

(Continued)

FOREIGN PATENT DOCUMENTS

CN             1775144 A    *    5/2006

*Primary Examiner* — Rodney B White
(74) *Attorney, Agent, or Firm* — Leong C. Lei

(57) ABSTRACT

A chair adjusting device includes a control pull-bar including an elongate plate assembly formed of multiple elongate plates and a short plate assembly formed of multiple short plates. The elongate plates have a movement hole and a pivot hole opposite to the movement hole, and connecting protrusions at one side the pivot hole and connecting dimples on a back side of the connecting protrusions. Separator plates are interposed between the elongate plates and have combination projections receivable into the connecting dimples and combination notches on a back side and receiving the connecting protrusions therein. The short plates have engaging projections at one side thereof, and engaging troughs on a back side. Partition plates are interposed between every two pieces of the short plates. The partition plates have fitting bulges receivable into the engaging troughs and on a back side and receiving the engaging projections therein.

13 Claims, 9 Drawing Sheets

(56) References Cited

U.S. PATENT DOCUMENTS

| | | | | |
|---|---|---|---|---|
| 4,693,514 A * | 9/1987 | Volkle | A47C 1/027 | 297/320 |
| 4,720,142 A * | 1/1988 | Holdredge | A47C 1/03277 | 297/301.3 X |
| 5,066,069 A * | 11/1991 | DeGelder | A47C 1/027 | 297/300.4 |
| 5,228,748 A * | 7/1993 | Neumuller | A47C 1/03294 | 297/300.1 |
| 5,328,242 A * | 7/1994 | Steffens | A47C 1/027 | 297/313 |
| 5,348,371 A * | 9/1994 | Miotto | A47C 1/0325 | 297/300.4 X |
| 5,356,200 A * | 10/1994 | Stumpf | A47C 1/027 | 297/301.1 |
| 5,423,594 A * | 6/1995 | Hancock | A47C 1/03255 | 297/300.2 X |
| 5,423,595 A * | 6/1995 | Hancock | A47C 1/0325 | 297/300.1 X |
| 5,560,682 A * | 10/1996 | Brown | A47C 1/03255 | 297/316 |
| 5,588,706 A * | 12/1996 | Neumueller | A47C 1/027 | 297/374 X |
| 5,664,834 A * | 9/1997 | Hsu | A47C 1/027 | 297/301.1 X |
| 5,676,425 A * | 10/1997 | Pernicka | A47C 1/027 | 297/375 |
| 5,685,607 A * | 11/1997 | Hirschmann | A47C 1/03255 | 297/300.8 X |
| 5,863,099 A * | 1/1999 | Hancock | A47C 1/027 | 297/374 |
| 6,120,096 A * | 9/2000 | Miotto | A47C 1/03255 | 297/300.1 X |
| 6,131,996 A * | 10/2000 | Gebhard | A47C 1/022 | 297/302.4 X |
| 6,467,844 B1 * | 10/2002 | Gebhard | A47C 1/027 | 297/300.7 X |
| 6,467,845 B1 * | 10/2002 | Chen | A47C 1/027 | 297/374 |
| 8,454,091 B2 * | 6/2013 | Therrien | A47C 1/0325 | 297/328 |
| 2024/0277146 A1 * | 8/2024 | Chen | A47C 1/026 | |

* cited by examiner

CONTROL PULL-BAR STRUCTURE OF CHAIR ADJUSTING DEVICE

TECHNICAL FIELD OF THE INVENTION

The present invention relates generally to a control pull-bar structure of a chair adjusting device, and more particularly to a control pull-bar structure of a chair adjusting device in which an elongate plate assembly and a short plate assembly are pre-assembled as sub-assemblies to thereby ease operation of assembling of the control pull-bar and thus effectively reducing the fabrication cost of the chair adjusting device.

DESCRIPTION OF THE PRIOR ART

As shown in FIG. 1, to enhance comfortability of sitting on a chair 1, an adjusting device 2 that is operable to adjust an elevation/depression angle of the chair 1 is arranged on an underside of a seat cushion 11 of the chair 1.

As shown in FIGS. 1, 2, and 3, the adjusting device 2 at least comprises a first control pull-bar set 21 and a second control pull-bar set 22 for adjusting the elevation/depression angle, wherein the first control pull-bar set 21 and the second control pull-bar set 22 have structures that are identical, and in the following, the first control pull-bar set 21 is taken as an example of illustrating the structure thereof. The first control pull-bar set 21 comprises an elongate plate assembly 23 and a short plate assembly 24. The elongate plate assembly 23 is formed by stacking a plurality of metallic elongate plates 231 of an elongate elliptic shape, and each of the elongate plates 231 comprises a movement hole 232 in the form of an elongate slot and a pivot hole 233 arranged at one side opposite to the movement hole 232 and having a circular shape. The short plate assembly 24 is formed by stacking a plurality of metallic short plates 241 of a circular shape, and each of the short plates 241 is formed with a pivot hole 242 that is of a circular shape.

As shown in FIGS. 1, 2, and 3, the first control pull-bar set 21 is assembled in such a way that each single piece of the elongate plates 231 of the elongate plate assembly 23 is fit over a pivot axle 251 of a pivoting seat 25 by means of the pivot hole 233, and the elongate plates 231 are stacked together, through such fitting, in a large number to form a portion of the first control pull-bar set 21. The short plate assembly 24 is fit, by means of the pivot hole 242 of each individual one of the short plates 241, onto an operation axle 26 having a limited operation range, and the short plates 241 are stacked together, through such fitting, in a large number to form another portion of the first control pull-bar set 21. More specifically, after the short plate assembly 24 is first fit, by means of the pivot hole 242 of each individual one of the short plates 241, onto the operation axle 26, each individual one of the elongate plates 231 of the elongate plate assembly 23 is fit, by means of the movement hole 232, onto the operation axle 26, meaning every two of the short plates 241 interpose the elongate plates 231 therebetween, so that each individual one of the elongate plates 231 of the elongate plate assembly 23 is fit, by means of the movement hole 232, onto the operation axle 26, while an opposite end is fit onto the pivot axle 251 of the pivoting seat 25, and every two of the short plates 241 further interpose the elongate plates 231 therebetween to thereby make the first control pull-bar set 21. To adjust the elevation/depression angle of the chair 1 by means of the adjusting device 2, the operation axle 26 is driven to move, for a preset distance, in an axial direction along the movement holes 232 of the elongate plate assembly 23 to thereby adjust the elevation/depression angle of the chair 1.

Such a known adjusting device 2, based on the above-described structure of the first control pull-bar set 21 and the second control pull-bar set 22, is effective in adjusting the elevation/depression angle of the chair 1. However, the elongate plate assembly 23 and the short plate assembly 24 of the first control pull-bar set 21 must be put onto the pivot axle 251 of the pivoting seat 25 and the operation axle 26 in a piece by piece manner with human labor (this being also applicable to the second control pull-bar set 22), so that the assembling is labor-consuming, and the labor cost in increased to thereby increase the fabrication cost of the adjusting device 2.

Thus, it is a challenge for the chair manufacturers to provide a control pull-bar structure of a chair adjusting device that effectively reduces the issue of excessively high cost due to complicated operation of assembling of the control pull-bar.

SUMMARY OF THE INVENTION

The primary objective of the present invention is made for is for the defect of a known chair adjusting device of which a control pull-bar requires a complicated operation for assembling so as to lead to a significant increase of the fabrication cost of the chair adjusting device.

The primary technical solution of the present invention is a control pull-bar structure of a chair adjusting device, wherein the chair adjusting device at least comprises a control pull-bar, and the control pull-bar comprising an elongate plate assembly and the a plate assembly; the elongate plate assembly is formed of a plurality of elongate plates, the elongate plates being formed with a movement hole and a pivot hole at one side opposite to the movement hole, connecting protrusions being formed at one side of the pivot hole, a back side of the connecting protrusions being formed with connecting dimples; every two pieces of the elongate plates interpose therebetween separator plates, the separator plates comprising through holes corresponding to the pivot holes of the elongate plates, the separator plates comprising combination projections, combination notches being on a back side of the combination projections, the combination projections being receivable into the connecting dimples, the connecting protrusions being receivable into the combination notches; the short plate assembly is formed of a plurality of short plates, the short plates being formed with a pivoting aperture, the short plates being provided, on one side thereof, with engaging projections, engaging troughs being on a back side of the engaging projections; every two pieces of the short plates interpose partition plates therebetween, the partition plates comprising fitting bulges corresponding to the engaging troughs, fitting recesses being on a back side of the fitting bulges, the fitting bulges being receivable into the engaging troughs, the engaging projections being receivable into the fitting recesses.

The efficacy that the primary solution of the present invention may achieve is that the elongate plate assembly and the short plate assembly can be easily made as sub-assemblies in advance so as to ease operation of assembling of the control pull-bar to thereby effectively reduce the fabrication cost of the chair adjusting device.

DETAILED DESCRIPTION OF THE PREFERRED EMBODIMENT

Figure 1:
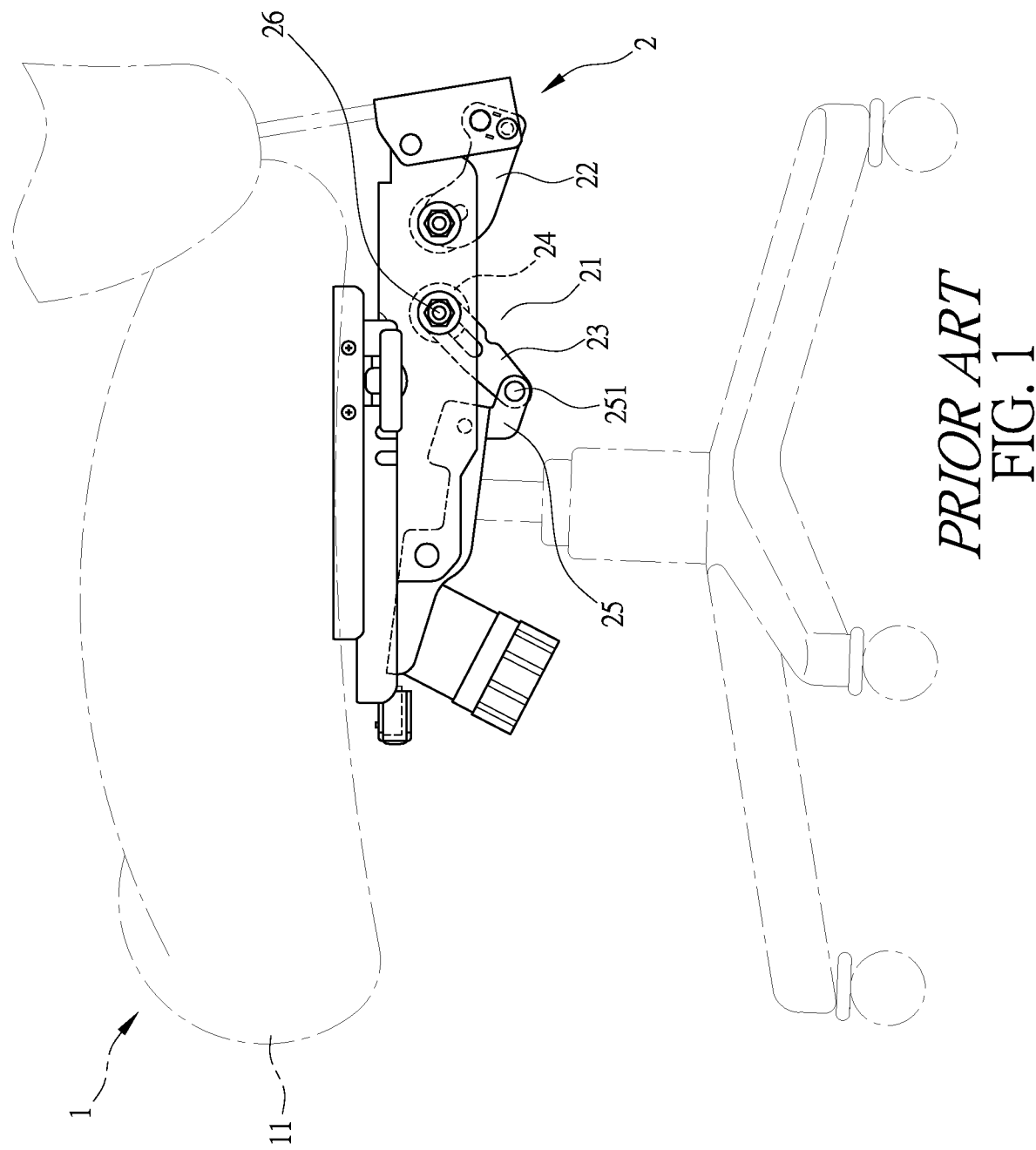
FIG. 1 is a schematic view showing a prior art adjusting device.
Figure 2:
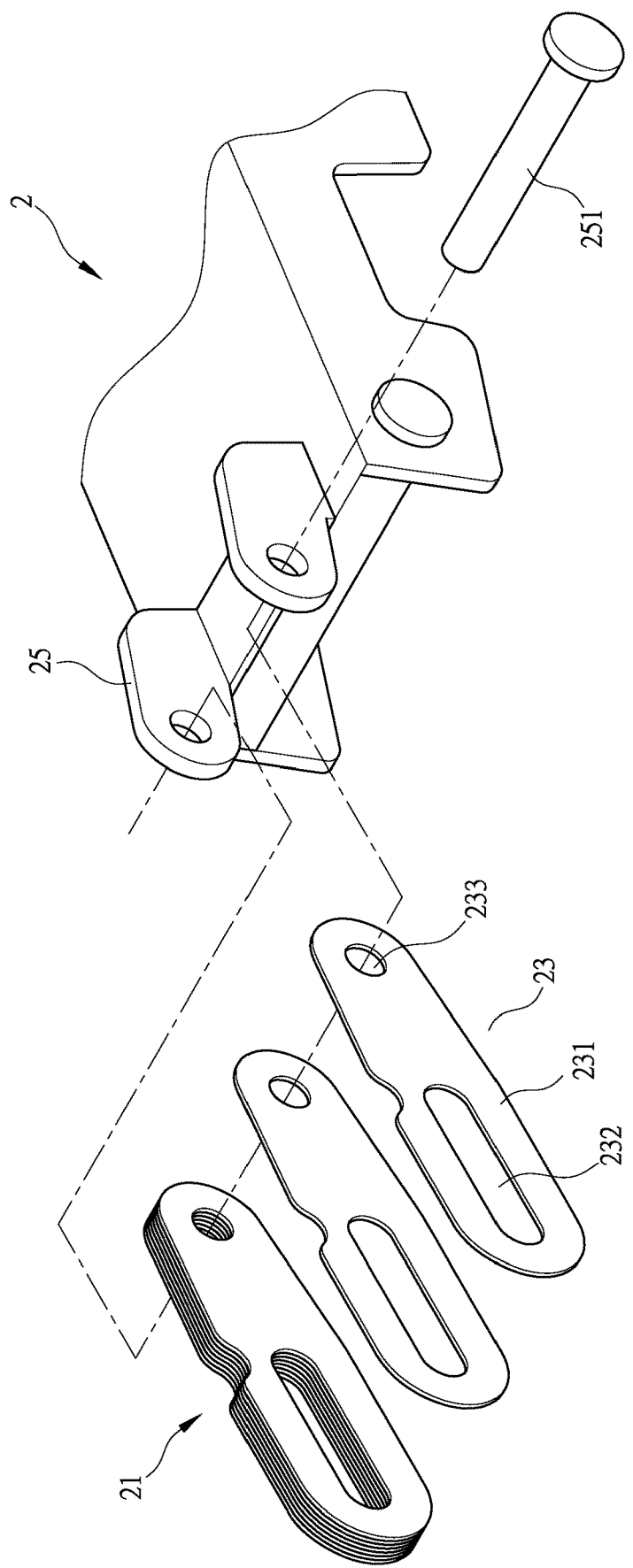
FIG. 2 is a schematic view showing an elongate plate assembly of a prior art first control pull-bar set.
Figure 3:
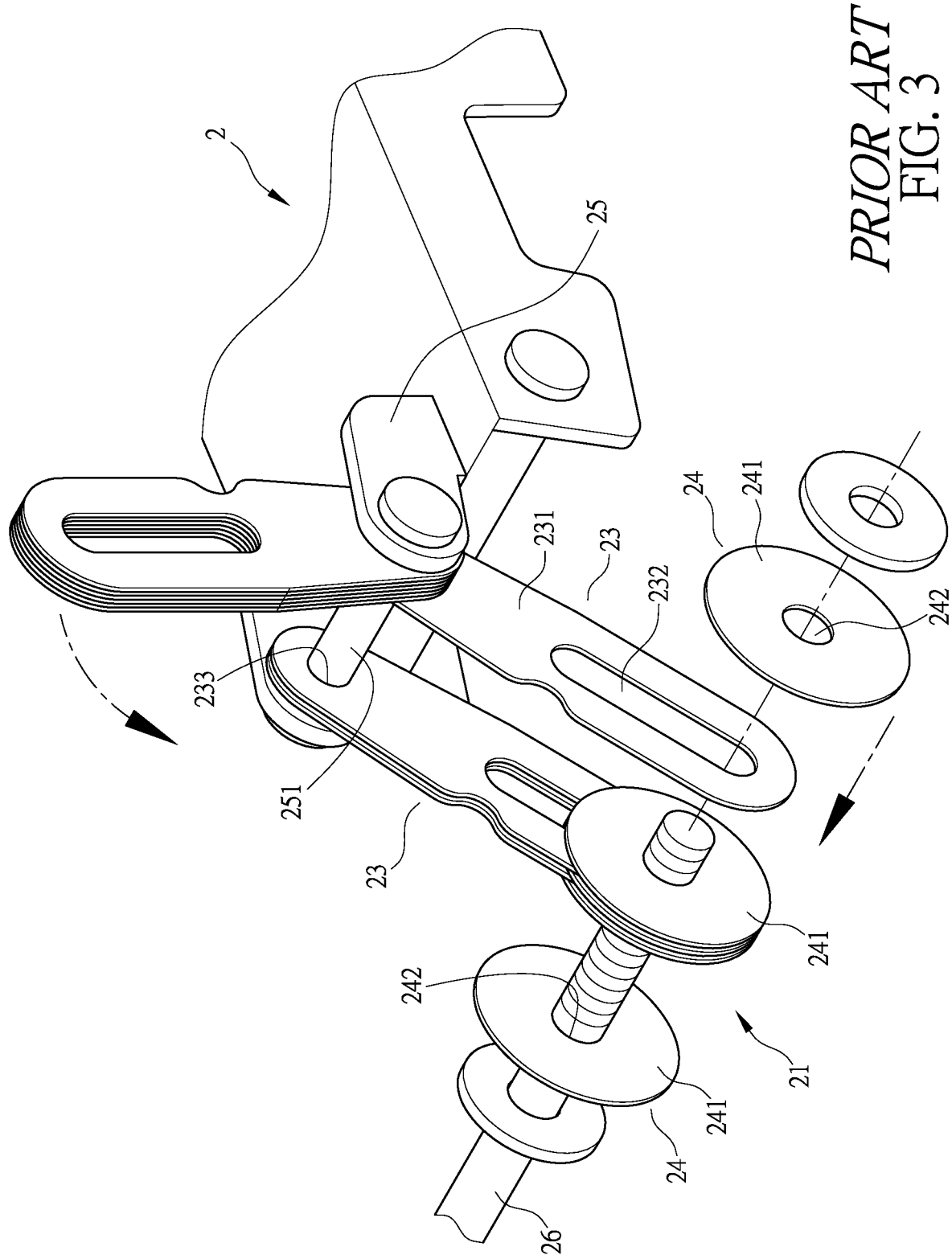
FIG. 3 is a schematic view showing operation of assembling of the prior art first control pull-bar set.
Figure 4:
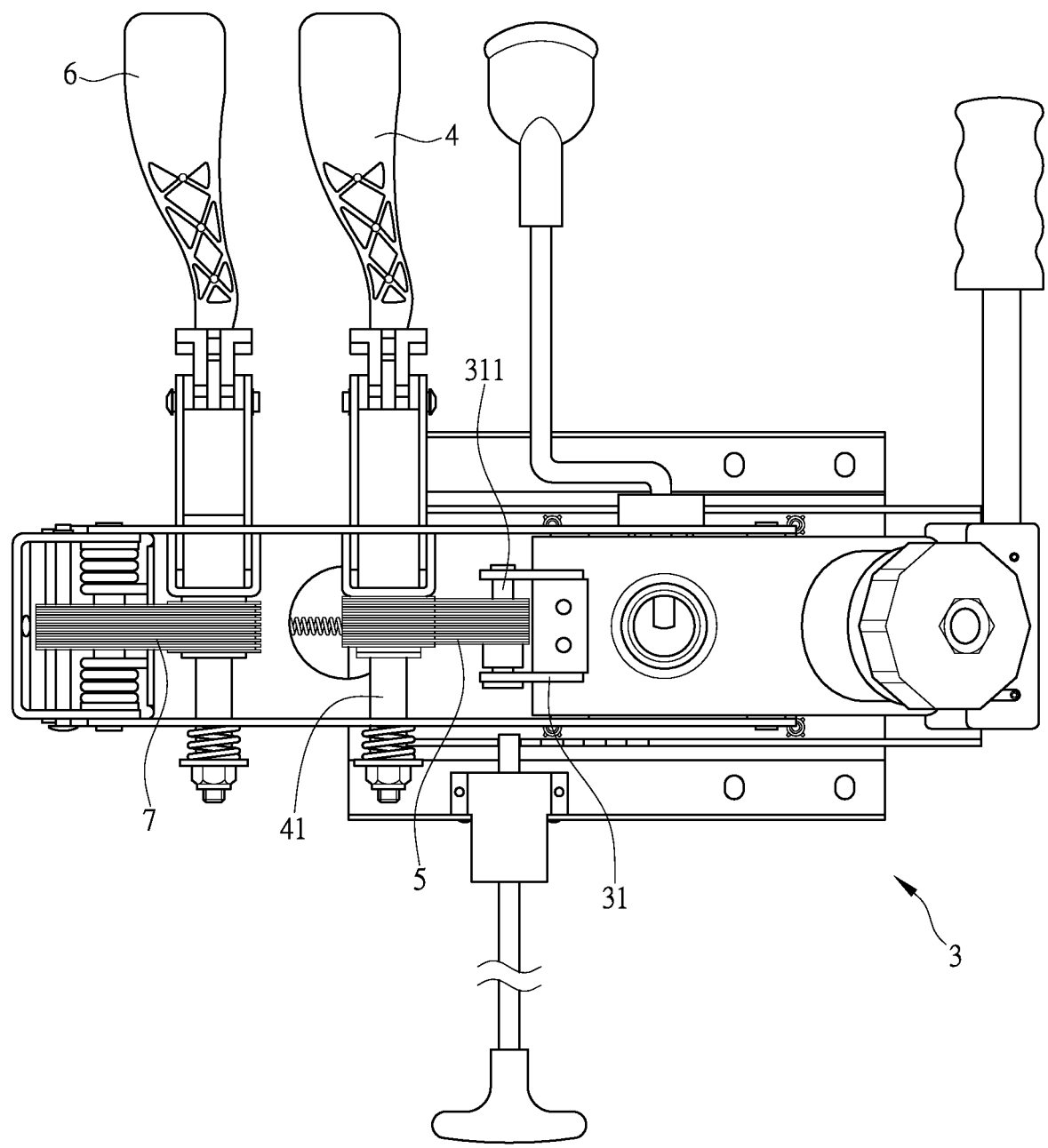
FIG. 4 is a bottom view showing a chair adjusting device according to the present invention.

For better understanding of the structure of the present invention, and also the efficacy that can be achieved thereby, a description will be provided below with reference to the attached drawings:

Referring firstly to FIG. 4, the present invention provides a chair adjusting device 3, which at least comprises a first control pull-bar 5 controllable by a first control bar 4 and a second control pull-bar 7 controllable by a second control bar 6. The chair adjusting device 3 controls an elevation/depression angle of a chair by means of the first control pull-bar 5 and the second control pull-bar 7.

Figure 5:
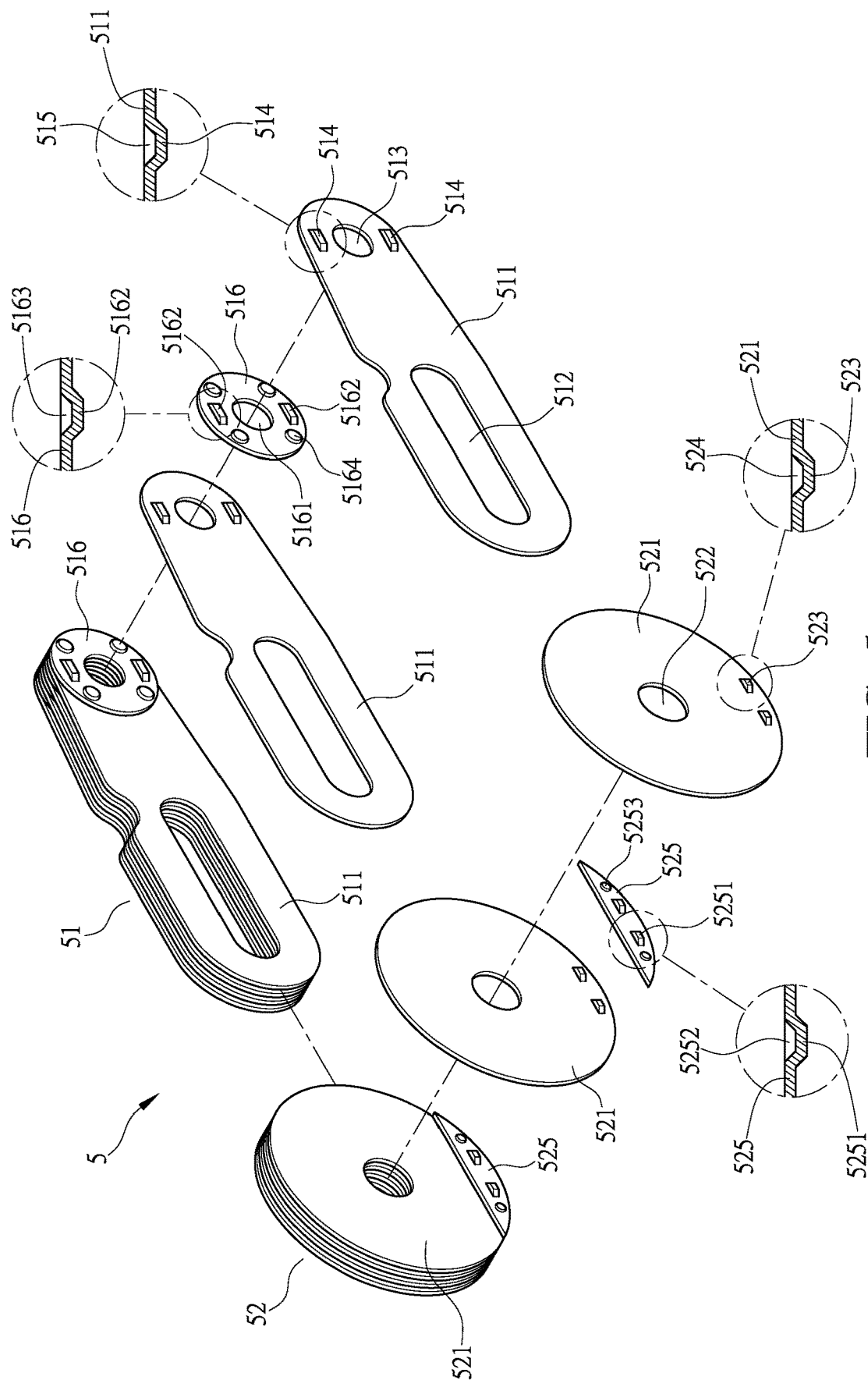
FIG. 5 is an exploded view showing a first control pull-bar of the present invention.
Figure 6:
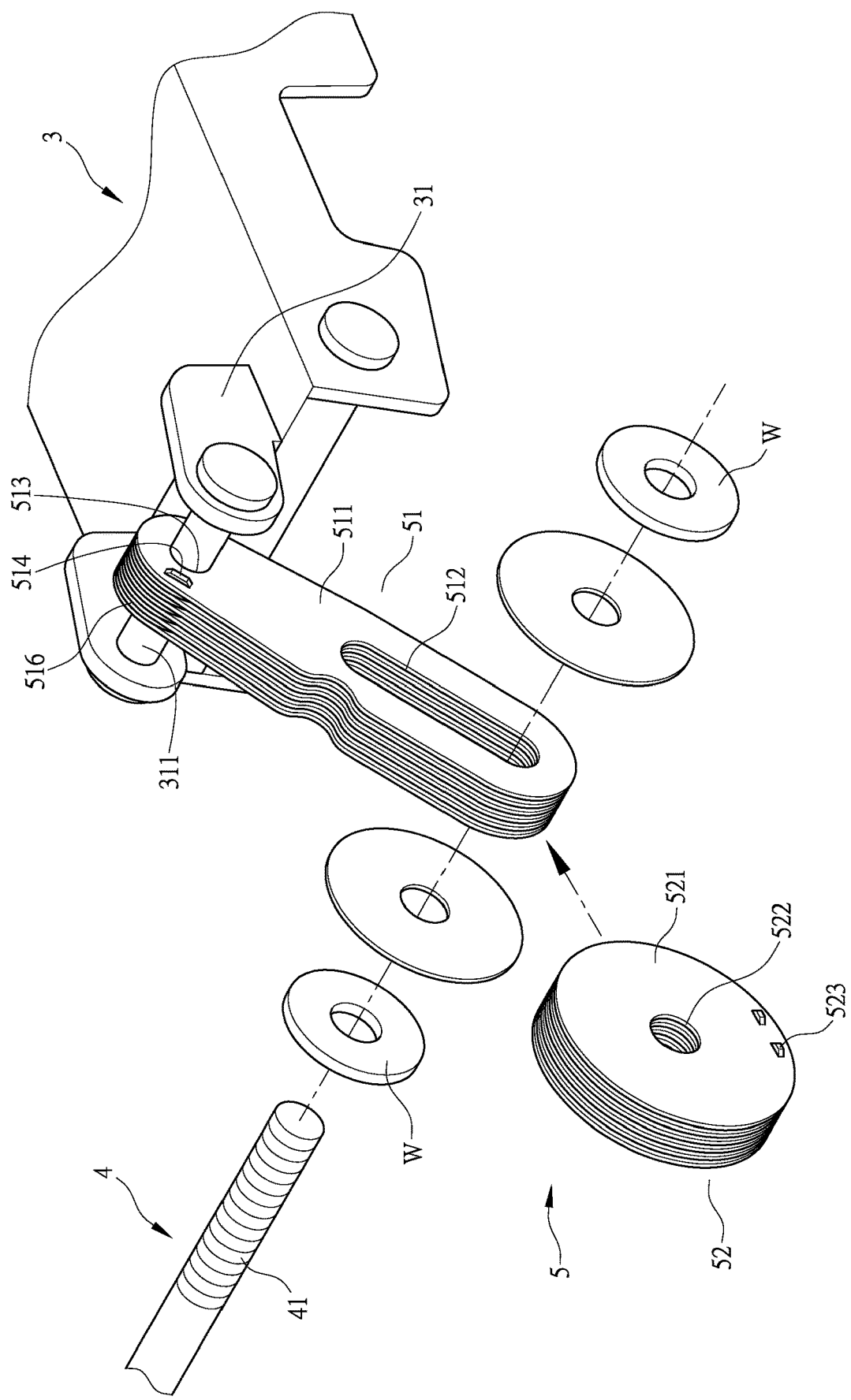
FIG. 6 is a schematic view showing operation of assembling of the first control pull-bar of the present invention.

As shown in FIGS. 4, 5, and 6, the first control pull-bar 5 and the second control pull-bar 7 have structures that are the same, and it is noted here that in the following, a description is provided by taking the structure of the first control pull-bar 5 as an example for illustration. The first control pull-bar 5 comprises an elongate plate assembly 51 and a short plate assembly 52. The elongate plate assembly 51 is formed by stacking a plurality of metallic elongate plates 511 of an elongate elliptic shape, and each of the elongate plates 511 is formed by means of stamping. Each of the elongate plates 511 comprises a movement hole 512 in the form of an elongate slot, a pivot hole 513 of a circular shape at an end opposite to the movement hole 512, and connecting protrusions 514 at two sides of the pivot hole 513 for connecting purposes. Formed on a back side of the connecting protrusions 514 are connecting dimples 515. The elongate plate assembly 51 further comprises separator plates 516 for separating purposes, and in the present invention, the separator plates 516 are implemented as a circular shaped body. The separator plates 516 are each formed, in a center thereof, with a through hole 5161, and the through holes 5161 correspond to the pivot holes 513. The separator plates 516 are provided, on two sides of the through hole 5161, with combination projections 5162 for combining purposes. The combination projections 5162 correspond to and match with the connecting dimples 515. Formed on a back side of the combination projections 5162 are combination notches 5163. The combination notches 5163 correspond to and match with the connecting protrusions 514. As such, the connecting protrusions 514 are receivable into the combination notches 5163 respectively. The separator plate 516 is further provided with at least one rib 5164 to prevent warpage. The rib 5164 is implemented in the form of multiple circular raised ribs.

As shown in FIGS. 4, 5, and 6, every two of the elongate plates 511 of the elongate plate assembly 51 are provided, at the end thereof where the pivot hole 513 is located, with one of the separator plates 516 arranged therebetween. By means of pressing, the two elongate plates 511 and the separator plate 516 are press-fit together as a one-piece structure, meaning the connecting protrusions 514 of the elongate plates 511 are pressed to fit into the combination notches 5163 of the separator plate 516 in a tight fitting manner, and the combination projections 5162 of the separator plate 516 are pressed into the connecting dimples 515 of another one of the elongate plates 511 in a tight fitting manner, so that a gap corresponding to a thickness of the separator plate 516 is formed between two elongate plates 511 at the side corresponding to the movement hole 512; and similarly, one of the separator plates 516 is arranged on the second elongate plate 511 at the side corresponding to the pivot hole 513, and one of the elongate plates 511 is then arranged on the separator plate 516, and then pressing is applied to have the connecting protrusions 514 of the second elongate plate 511 fit into the combination notches 5163 of another one of the separator plates 516 in a tight fitting manner, and simultaneously, the combination projections 5162 of the separator plate 516 are pressed to fit into the connecting dimples 515 of another one of the elongate plates 511 in a tight fitting manner. In this way, a thickness of the elongate plate assembly 51 can be preset through pressing, and thus, the elongate plate assembly 51 is set up to form tight-fitting connection at one end (the end where the pivot hole 513 is arranged) through pressing, and at another end (the end where the movement hole 512 is arranged), each of the elongate plates 511 and an adjacent one of the elongate plates 511 are held to have a spacing distance therebetween, and a width of the spacing distance is generally corresponding to the thickness of the separator plates 516, and as such, the elongate plate assembly 51 is made as a pre-assembled sub-assembly.

As shown in FIGS. 4, 5, and 6, the short plate assembly 52 is formed by stacking a plurality of metallic short plates 521, and in the present invention, as a first embodiment, plates of a circular shape is taken as an example for the short plates 521 for illustration. Each of the short plates 521 of the circular shape is formed with a pivoting aperture 522 that is of a circular shape, and one side of the short plate 521 is formed with engaging projections 523, and in the present invention, engaging projections 523 being arranged pairwise as a left one and a right one is taken as an example for illustration. Formed on a back side of the engaging projections 523 are engaging troughs 524. Every two of the short plates 521 are provided a partition plate 525 therebetween, and the partition plate 525 is formed with fitting bulges 5251 that correspond to the engaging troughs 524 of the short plates 521, and formed on a back side of the fitting bulges 5251 are fitting recesses 5252. The engaging projections 523 are receivable into the fitting recesses 5252, and the fitting bulges 5251 are receivable into the engaging troughs 524, so that said every two of the short plates 521 are coupled by means of one partition plate 525 therebetween, and every two of the short plates 521 are formed therebetween with a spacing distance at one side that is opposite to the partition plate 525. The partition plate 525 is further provided with at least one rib 5253 to prevent warpage. The rib 5253 is implemented in the form of multiple circular raised ribs.

As shown in FIGS. 4, 5, and 6, every two of the short plates 521 of the short plate assembly 52 includes one partition plate 525 arranged therebetween at one side. By means of pressing, the two short plates 521 and the partition plate 525 are press-fit together as a one-piece structure, meaning the engaging projections 523 of the short plates 521 are pressed to fit into the fitting recesses 5252 of the partition plate 525 in a tight fitting manner, and the fitting bulges 5251 of the partition plate 525 are pressed into the engaging troughs 524 of another one of the short plates 521 in a tight fitting manner, so that a spacing distance corresponding to a thickness of the partition plate 525 is formed between two short plates 521 at the side that is opposite to the partition plate 525; and similarly, one partition plate 525 is arranged on one side of the second short plate 521, and then pressing is applied to have the engaging projections 523 of the second short plate 521 fit into the fitting recesses 5252 of the partition plate 525, and simultaneously, the fitting bulges 5251 of the partition plate 525 are pressed to fit into the engaging troughs 524 of another one of the short plates 521. In this way, a thickness of the short plate assembly 52 can be preset through pressing, and thus, the short plate assembly 52 is set up to form tight-fitting connection at one end through pressing, and at another end, each of the short plates 521 and an adjacent one of the short plates 521 are held to have a spacing distance therebetween, and a width of the spacing distance is generally corresponding to the thickness of the partition plates 525, and as such, the short plate assembly 52 is made as a pre-assembled sub-assembly.

Figure 7:
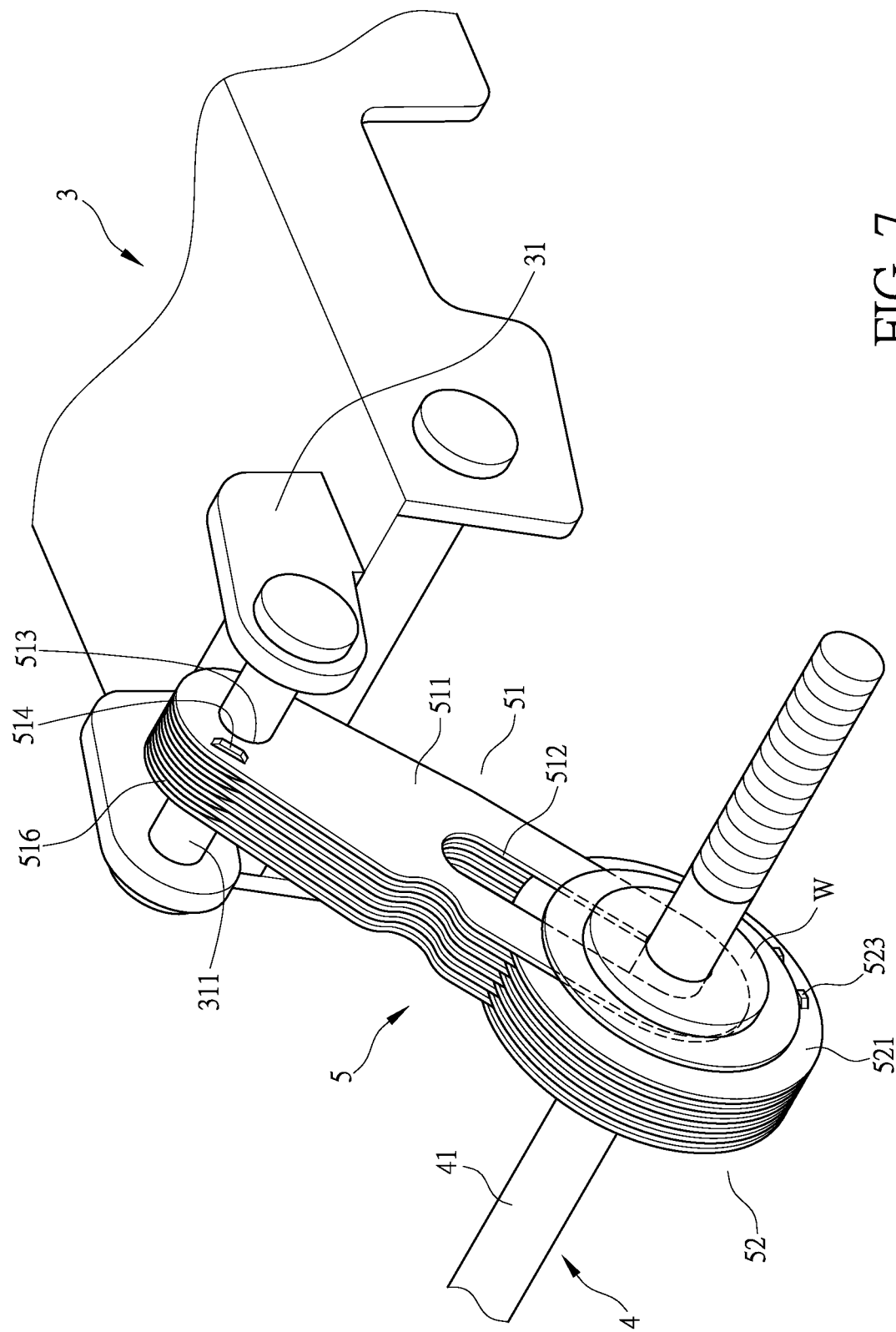
FIG. 7 is a schematic view showing the first control pull-bar of the present invention in an assembled form.

As shown in FIGS. 4, 6, and 7, in the present invention, the ways of assembling the first control pull-bar 5 and the second control pull-bar 7 of the chair adjusting device 3 are the same, and in the following, a description is provided by taking the way of assembling the first control pull-bar 5 as an example for illustration. Since the elongate plate assembly 51 and the short plate assembly 52 of the first control pull-bar 5 are each made as a one-piece sub-assembly by means of pressing in the way described above, the elongate plate assembly 51 is fit, in a manner of being rotatable, over a pivot axle 311 of a pivoting seat 31 of the chair adjusting device 3 by means of the pivot holes 513. The movement holes 512 of the elongate plate assembly 51 are arranged to insert into the short plate assembly 52 in a manner of being mutually interleaved with each other, and more specifically, each of the short plates 521 and another one of the short plates 521 adjacent thereto include a spacing distance therebetween, and each of the elongate plates 511 and another one of the elongate plates 511 adjacent thereto also include a spacing distance therebetween, so that one elongate plate 511 can be inserted between the short plate 521 and said another one short plate 521 adjacent thereto; or oppositely speaking, one short plate 521 can be inserted between each of the elongate plates 511 and another one of the elongate plates 511 adjacent thereto; and the movement holes 512 of the elongate plate assembly 51 are set to align with the pivoting apertures 522 of the short plate assembly 52, so that the movement holes 512 and the pivoting apertures 522 can be used to have the elongate plate assembly 51 and the short plate assembly 52 jointly fit, in a rotatable manner, onto a pivot axle 41 of the first control bar 4, and finally, washers W are fit to and set at two outer sides of the first control pull-bar 5. As such, an operator for assembling can assemble the first control pull-bar 5 in an efficient and accurate manner to thereby greatly reduce the assembling cost of the first control pull-bar 5. In this way, through operating the first control bar 4, the first control pull-bar 5 is caused to operate to thereby allow the chair adjusting device 3 to control and adjust the elevation/depression angle of the chair.

Figure 8:
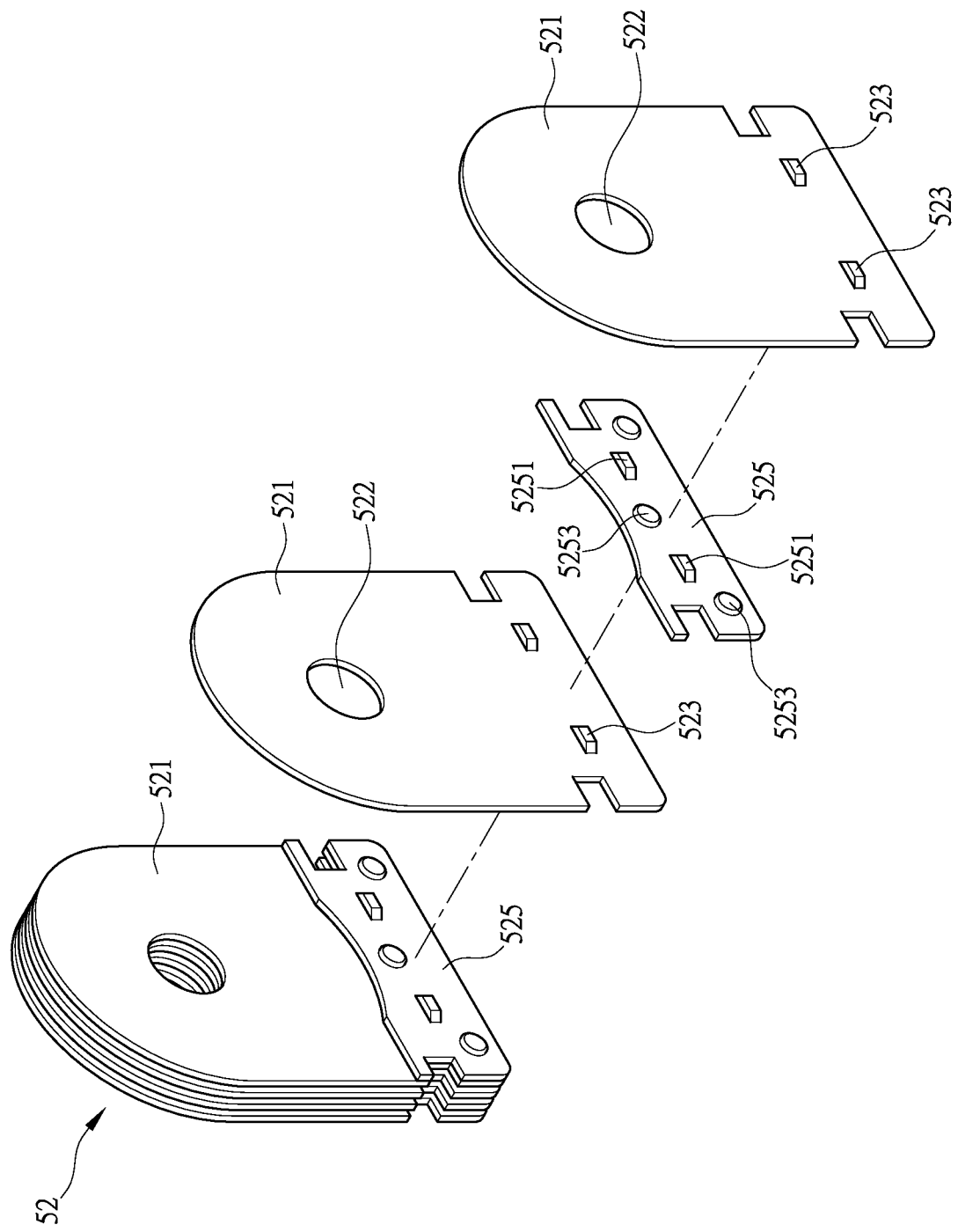
FIGS. 8 and 9 show a short plate assembly according to another embodiment of the present invention.
Figure 9:
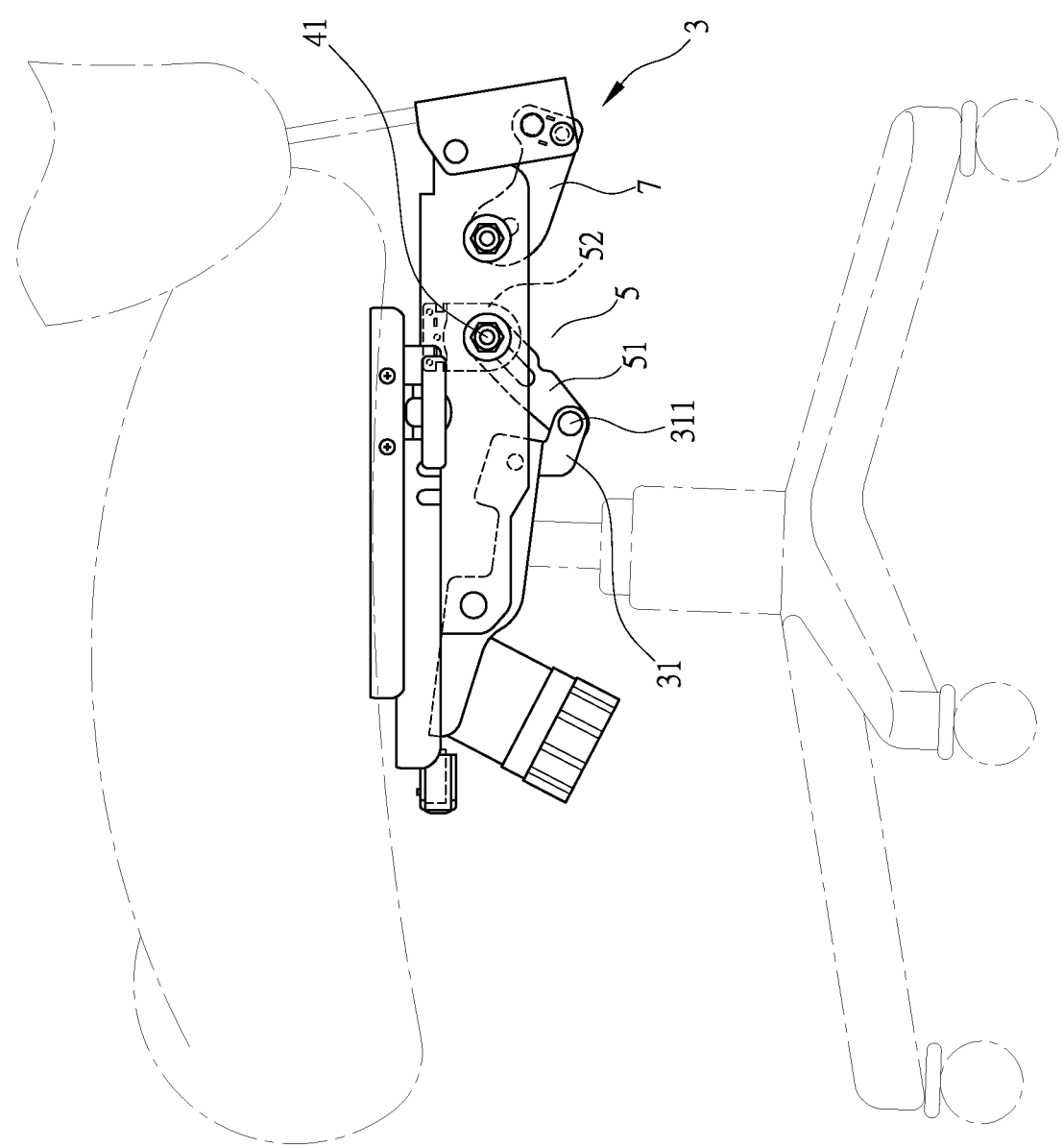

As shown in FIGS. 8 and 9, to implement the present invention, the short plate assembly 52 can be further designed to have an arch shape, meaning each single piece of the short plates 521 is made in an arch shape, while each of the partition plates 525 is designed in an elongate rectangular shape, so that with each single piece of the short plates 521 being of an arch shape and each of the partition plates 525 being designed in an elongate rectangular shape, pressing and forming of the short plates 521 and the partition plates 525 are made easy, and also, an effect of making the short plate assembly 52 as a sub-assembly for assembling can be achieved.

The efficacy of the present invention is that a chair adjusting device 3 at least comprises a first control pull-bar 5, the first control pull-bar 5 comprising an elongate plate assembly 51 and a short plate assembly 52; the elongate plate assembly 51 is formed of a plurality of elongate plates 511, the elongate plates 511 being formed with a movement hole 512, and a pivot hole 513 formed at one side opposite to the movement hole 512, connecting protrusions 514 being formed at one side of the pivot hole 513, a back side of the connecting protrusions 514 being formed with connecting dimples 515; every two pieces of the elongate plates 511 interpose therebetween separator plates 516, the separator plates 516 comprising through holes 5161 corresponding to the pivot holes 513 of the elongate plates 511, the separator plates 516 comprising combination projections 5162, combination notches 5163 being on a back side of the combination projections 5162, the combination projections 5162 being receivable into the connecting dimples 515, the connecting protrusions 514 being receivable into the combination notches 5163; the short plate assembly 52 is formed of a plurality of short plates 521, the short plates 521 being formed with a pivoting aperture 522, the short plates 521 being provided, on one side thereof, with engaging projections 523, engaging troughs 524 being on a back side of the engaging projections 523; every two pieces of the short plates 521 interpose partition plates 525 therebetween, the partition plates 525 comprising fitting bulges 5251 corresponding to the engaging troughs 524, fitting recesses 5252 being on a back side of the fitting bulges 5251, the fitting bulges 5251 being receivable into the engaging troughs 524, the engaging projections 523 being receivable into the fitting recesses 5252; and as such, it is made easy that the elongate plate assembly 51 and the short plate assembly 52 can be assembled in advance as sub-assemblies to ease operation of assembling of the first control pull-bar 5.

I claim:

1. A control pull-bar structure of a chair adjusting device, wherein the chair adjusting device at least comprises a control pull-bar, and the control pull-bar comprising an elongate plate assembly and a short plate assembly; the elongate plate assembly is formed of a plurality of elongate plates, the elongate plates being formed with a movement hole and a pivot hole at one end opposite to the movement hole, connecting protrusions being formed on one side of each elongate plate adjacent the pivot hole, a back side of the connecting protrusions being formed with connecting dimples; every two pieces of the elongate plates interpose therebetween separator plates, the separator plates comprising through holes corresponding to the pivot holes of the elongate plates, the separator plates comprising combination projections, combination notches being on a back side of the combination projections, the combination projections being receivable into the connecting dimples, the connecting protrusions being receivable into the combination notches; the short plate assembly is formed of a plurality of short plates, the short plates being formed with a pivoting aperture, the short plates being provided, on one side thereof, with engaging projections, engaging troughs being on a back side of the engaging projections; every two pieces of the short plates interpose partition plates therebetween, the partition plates comprising fitting bulges corresponding to the engaging troughs, fitting recesses being on a back side of the fitting bulges, the fitting bulges being receivable into the engaging troughs, the engaging projections being receivable into the fitting recesses.

2. The control pull-bar structure of the chair adjusting device according to claim 1, wherein the connecting protrusions of the elongate plates and the combination projections of the separator plates are arranged pairwise as a left one and a right one.

3. The control pull-bar structure of the chair adjusting device according to claim 2, wherein the partition plates are of an elongate rectangular shape.

4. The control pull-bar structure of the chair adjusting device according to claim 2, where the separator plates are further provided with at least one rib.

5. The control pull-bar structure of the chair adjusting device according to claim 1, wherein the engaging projections of the short plates and the fitting bulges of the partition plates are arranged pairwise as a left one and a right one.

6. The control pull-bar structure of the chair adjusting device according to claim 5, wherein the short plates are of a circular shape.

7. The control pull-bar structure of the chair adjusting device according to claim 5, wherein the short plates are of an arch shape.

8. The control pull-bar structure of the chair adjusting device according to claim 5, wherein the partition plates are further provided with at least one rib.

9. The control pull-bar structure of the chair adjusting device according to claim 1, wherein the short plates are of a circular shape.

10. The control pull-bar structure of the chair adjusting device according to claim 1, wherein the short plates are of an arch shape.

11. The control pull-bar structure of the chair adjusting device according to claim 1, wherein the partition plates are of an elongate rectangular shape.

12. The control pull-bar structure of the chair adjusting device according to claim 1, where the separator plates are further provided with at least one rib.

13. The control pull-bar structure of the chair adjusting device according to claim 1, wherein the partition plates are further provided with at least one rib.

* * * * *